United States Patent [19]

Gutbier et al.

[11] 4,407,903

[45] Oct. 4, 1983

[54] ELECTRIC DC SOURCE

[75] Inventors: Heinrich Gutbier, Röttenbach; Karl Strasser, Erlangen; Elmar Limberg, Lübeck; Volker Jensen, Krummesse, all of Fed. Rep. of Germany

[73] Assignees: Siemens Aktiengesellschaft, Munich; Ingenieurkontor Lübeck, Lübeck, both of Fed. Rep. of Germany

[21] Appl. No.: 320,709

[22] Filed: Nov. 12, 1981

[30] Foreign Application Priority Data

Nov. 19, 1980 [DE] Fed. Rep. of Germany ....... 3043692

[51] Int. Cl.$^3$ .............................................. H01M 8/04
[52] U.S. Cl. ......................................... 429/23; 429/21
[58] Field of Search .......................... 429/23, 22, 19, 21

[56] References Cited

U.S. PATENT DOCUMENTS

| | | | |
|---|---|---|---|
| 3,580,741 | 5/1971 | Hovious et al. | 429/23 |
| 3,745,047 | 7/1973 | Fanivello et al. | 429/23 |
| 3,915,747 | 10/1975 | Summers et al. | 429/23 |
| 4,081,585 | 3/1978 | Jacquelin | 429/23 |
| 4,098,960 | 7/1978 | Gagnon | 429/23 X |

Primary Examiner—Charles F. LeFevour
Attorney, Agent, or Firm—Kenyon & Kenyon

[57] ABSTRACT

An electric dc source with fuel cells or fuel batteries connected in series or in series and parallel, not only gives quiet operation, but does so without a large power electronics system, by providing a separate gas supply to each fuel cell or fuel battery and disposing controllable valves in the gas supply lines and connecting outputs having a given polarity of the series connected fuel cells or fuel batteries to a bus bar of the same polarity via electric valves.

3 Claims, 3 Drawing Figures

ELECTRIC DC SOURCE

BACKGROUND OF THE INVENTION

This invention relates to power sources in general and more particularly to an electric dc source using fuel cells or fuel batteries connected in series or in series and parallel.

For dc drives it is common practice to connect batteries electrically in series and/or in parallel in order to vary the voltage. The same also applies to fuel cells or fuel batteries, i.e. batteries consisting of several individual fuel cells or groups of fuel cells. Fuel cells are electrochemical arrangements in which the free enthalpy of the oxidation of a fuel is converted directly into electrical energy and the reactants, i.e. fuel and oxidizing agent, are fed to the cell continuously. Gaseous reactants such as hydrogen and oxygen, or air, generally are used for this purpose.

Connecting the batteries of this type in series or in parallel is done in most cases by mechanical switchgear which, however, is quite noisy, thus representing a certain pollution of the environment. While power electronics like thyristor switches and/or dc regulators may also be used for switching, they are relatively bulky, and in addition, not entirely noiseless either.

It is thus an object of the present invention to provide an electric dc source utilizing fuel cells or fuel batteries connected in series or in series and parallel in which, not only is quiet operation made possible, but large power electronics may also be dispensed with.

SUMMARY OF THE INVENTION

According to the present invention, this object is accomplished by providing each fuel cell or fuel battery with a separate gas supply and disposing controllable valves in the gas supply lines and by connecting outputs of one polarity of the fuel cells or fuel batteries, which are connected in series, to a bus bar of the same polarity via electric valves.

The output voltage of the dc source according to the present invention, which avoids mechanical switching noises, is controlled by so-called switching on the gas side. To accomplish this, the gas supply to individual fuel cells or fuel batteries is controlled, independently of the supply to the other cells or batteries, in accordance with the demand for electric energy. The voltage is adjusted noiselessly by controlling the—relatively small—reactant valves in the gas supply lines. Switching occurs exclusively on the gas side, i.e., the cells or batteries stay electrically connected at all times.

The dc source according to the present invention is especially suited as an electric drive. In addition, this dc source can also be used for other applications, such as in welding equipment or to charge batteries.

When used as an electric drive in which output and speed of rotation are controlled by switching on the gas side, the device according to the present invention offers the following advantages, in particular:

Noiseless, stepwise voltage variation within wide setting ranges without noisy dc circuit breakers or similar devices or costly, controllable electronic power operating means;

noiseless shut down of fuel cell systems so that, in the lower speed range used predominantly, the fuel cells or fuel batteries participating in the release of energy are operated at the peak of their efficiency (fuel cells or fuel batteries operate at peak efficiency at a load factor of approx. 30%, at which an efficiency exceeding 60% can be attained);

prolonged life of fuel cell systems, brought about by the fact that, for the lower-range speeds used predominantly, cells and batteries not needed are not activated or that, according to the control program, other fuel cells and fuel batteries are, in part, also used for the same operating speed (equalization of operating hours).

The dc source according to the present invention is particularly well suited for supplying power to electric propulsion units for ships, especially underwater vessels. It is of particular advantage that only as many fuel cells or fuel batteries need be brought into operation as are respectively required for the propulsion energy needed. The gases fed to the cells or batteries are thus utilized optimally as is the energy generated. In submarine vehicles this results—besides the low noise speed control—in the additional advantage that operation is independent of outside air due to the use of fuel cells or fuel batteries.

The electric valves disposed in the electrical cell or battery outputs in the device according to the present invention may be diodes. This makes possible a raising or lowering of the drive's travel speed without controllable power electronics.

By the electric valves may also be controlled valves, which is important especially for starting purposes. For, the starting of motors can cause very high currents which, under some circumstances, can bring about fuel cell or fuel battery overloading. Such overloading can be avoided and "soft" starting behavior achieved by the use of controlled valves.

The electrical starting behavior can also be influenced in that a defined reactant pressure control is provided after the reactant valves are opened, whereby the pressure on the oxygen side, in particular, is brought slowly to the actual operating pressure.

DETAILED DESCRIPTION

Figures 1, 1A:
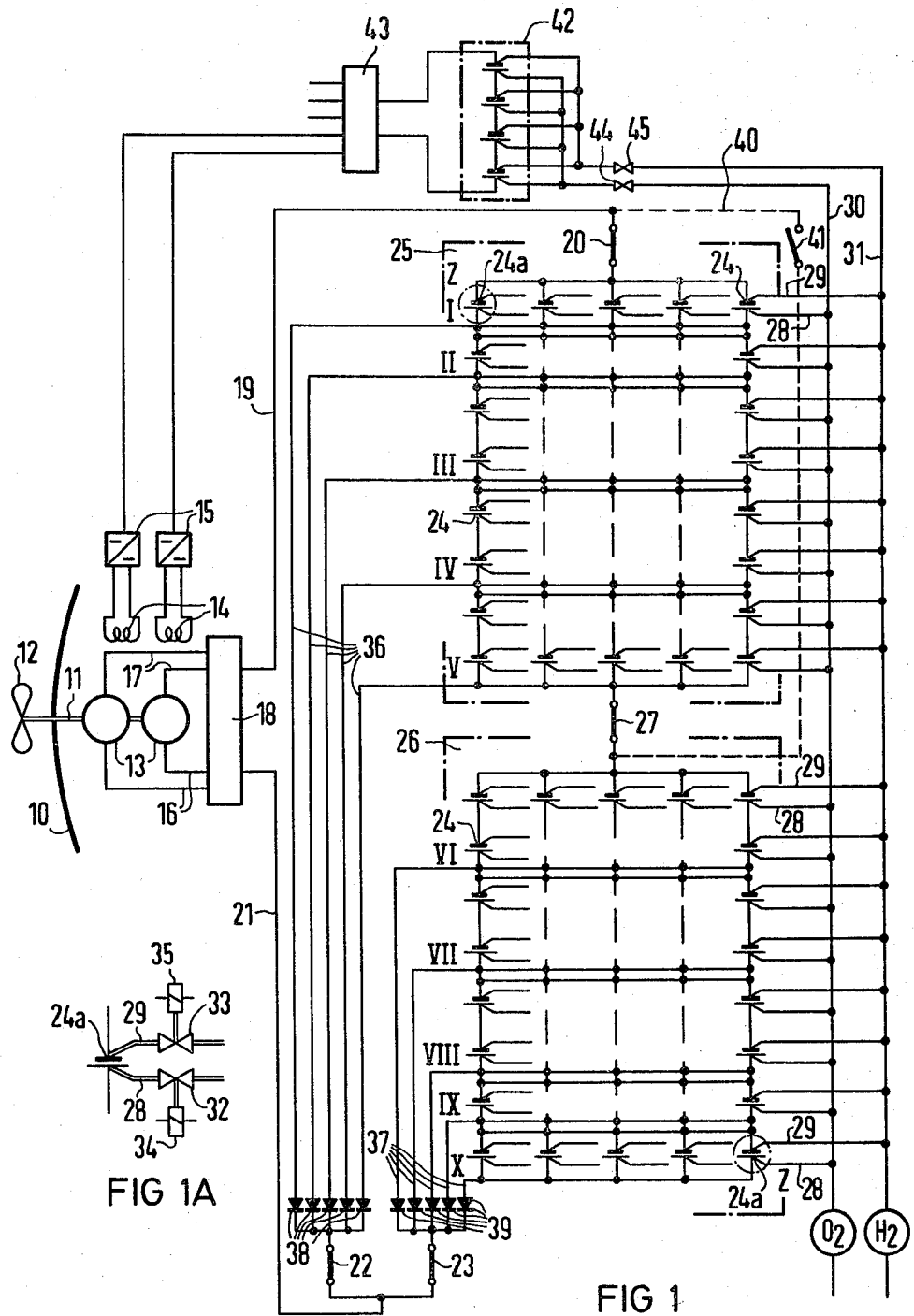
FIG. 1 is a schematic diagram of an embodiment of the electric dc source according to the present invention for a ship's propulsion system.
FIG. 1A is a detail of FIG. 1.

As schematically illustrated in FIG. 1, the drive shaft 11 of a propeller 12, joined in the usual manner to electric propeller motors 13, is brought through the outer skin 10 of a ship such as a submarine vessel. The field windings 14 of these motors are connected to a dc source via exciter converters 15, as explained more explicitly below.

Via lines 16 and 17, the motors 13 are connected electrically to a switchboard 18 which contains switching equipment of the usual kind and whose switching devices are not actuated during normal travel. A bus bar 19 goes from the switchboard 18 to a switch 20, and a bus bar 21 to the switches 22 and 23. The fuel cells or fuel batteries 24 and 24a, respectively in FIG. 1, are shown in the form of current sources for simplicity and are connected to these switches. As indicated in FIG. 1, the fuel cells or fuel batteries, hereinafter called fuel cell units 24 for short, are combined into two groups. For practical reasons, these two groups are installed into two separate rooms 25 and 26 and can be disconnected electrically by the switches 23 and 27 and 20 and 22, respectively.

Not all fuel cells units 24 are shown in the drawing for the sake of better clarity, some being only indicated. By the same token, the separate gas supplies for the individual fuel cell units 24 are shown only for some units, while they are only indicated for the remaining units. In addition, also for the sake of better clarity, the controlled valves disposed in the gas supply lines are not shown in FIG. 1 either. These valves can rather be seen in FIG. 1A.

In FIG. 1A, the detail of the fuel cell units 24a according to FIG. 1, marked Z, is shown enlarged. Each fuel cell unit has its own gas supply in the form of the gas supply lines 28 and 29. The gas supply lines 28 and 29 are connected to the main lines 30 and 31, respectively, (see FIG. 1), such as for oxygen and hydrogen. Disposed in the gas supply lines 28 and 29 are valves 32 and 33, respectively, operated by associated control members 34 and 35. The valves 32 and 33 may be designed as mechanically operated gas control members, as electrically operated solenoid valves or as hydraulically driven valves.

In the embodiment according to FIG. 1, groups of five or ten fuel cell units 24 are combined electrically into subgroups marked I to X; the embodiment according to FIG. 1 has a total of eighty fuel cell units 24. The subgroups are series connected, whereby a group of 40 fuel cell units consisting of the subgroups I to V is accommodated in the space 25, and a group of 40 fuel cell units consisting of the subgroups VI to X in the space 26. As already explained, these two groups can be separated from each other electrically by the switches 23 and 27 and 20 and 22, respectively.

The outputs of the series connected subgroups I to V and VI to X of same polarity are connected to the bus bar 21 of the same polarity by the lines 36 and 37 and via the switches 22 and 23 respectively. Disposed in each line 36 and 37 is an electric valve 38 or 39, respectively, such as a diode. The bus bar 21 is connected to the switchboard 18, as is the bus bar 19. The bus bar 19 may also be connected directly to the group of fuel cell units consisting of the subgroups VI to X by a line 40, bypassing the group of fuel cell units consisting of the subgroups I to V, a switch 41 being disposed in the line 40.

To set desired rotary speeds, the fuel cell units 24 are activated successively in the ship's propulsion system shown in FIG. 1 in accordance with the transient behavior, output capacity and thermal condition of the system until the rate of travel in which the desired rotary speed n lines is reached.

For example, if the drive system of the ship or underwater vessel is to be brought from standstill to the speed $n_4$ in the travel rate range IV, all fuel cell units 24 of the subgroup I are connected to the main lines 30 and 31 for oxygen and hydrogen, respectively, via the reactant valves 32 and 33. The exciter system of the motors 13 is energized by the exciter converters 15 and the field windings 14.

The exciter converters 15 can advantageously be supplied by a separate fuel cell system 42, comprising four fuel cell units, for instance. For this purpose, the exciter converters 15 are connected to the fuel cell system 42 via a switchboard 43. Other consumers may also be connected to the fuel cell system 42 via the switchboard 43. On the gas side, the fuel cell system 42 is connected to the main lines 30 and 31 for oxygen and hydrogen, respectively, via valves 44 and 45. According to its application, the fuel cell system 42 operates at an approximately constant output voltage.

Depending on the fuel cell response characteristic, a current now starts to flow from the fuel cell units of the subgroup I through its line 36 including its diode 38, the switch 22 and the bus bar 21 to the switchboard 18 and the motors 13 and thence through the bus bar 19 and the switch 20 back to the fuel cells units of the subgroup I. After the motors have started, their speed is increased by field weakening so that, after a certain period of time, the additional activation of the fuel cell units of the subgroup II becomes possible by switching on the gas side.

After the voltage buildup in the fuel cell units of the subgroup II, the diode 38 in the line 36 belonging to this subgroup becomes conducting in the forward direction because its anode is at a higher positive potential than its cathode. This causes the current to be commutated to the fuel cell units of the subgroup II and its diode; the diode 38 in the line 36 belonging to the subgroup I is back biased with respect to this potential thus, preventing a short-circuit of the subgroup II.

Further acceleration is accomplished in an analogous manner until the desired travel rate is reached. The fine rotary speed adjustment and control within this travel rate is then accomplished by field changing, i.e. by field current adjustment via the exciter converters 15. After attainment of the velocity associated with the desired number of revolutions (a steady state condition), as many parallel connected units within the activated subgroups of fuel cell units can be disconnected on the gas side as required to permit the remaining fuel cell units to be able to operate, together with the ship's propulsion motor system, and taking into consideration all external auxiliary equipment, at the peak of their efficiency (optimum efficiency of the entire plant).

With the embodiment of the dc source according to the present invention as shown in FIG. 1, including the switching equipment, the following objectives in particular can also be met:

Installation protection

Disaster switching actions and redundancy switching actions

Special programs in connection with quick stop maneuvers and reversing maneuvers (not all the components required are shown in the drawing)

Warming up of the fuel cell system.

Figure 2:
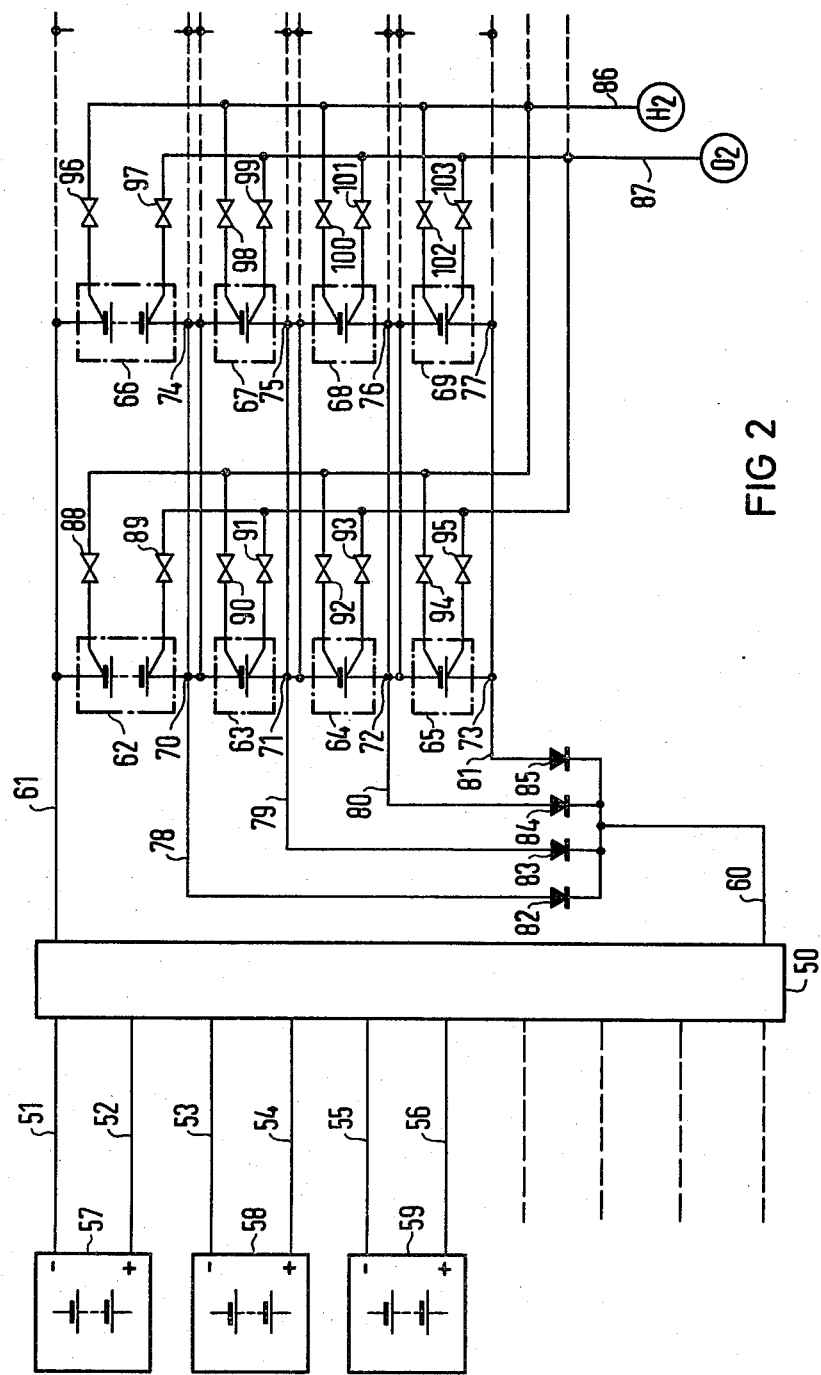
FIG. 2 is a schematic diagram of an embodiment of the electric dc source according to the present invention for the charging of secondary batteries.

In FIG. 2 an embodiment of the dc source according to the present invention which is used for charging secondary batteries is shown. Here, by means of electric connections 51 to 56, the secondary batteries 57 to 59 to be charged, for example, lead batteries or other types suited for electrotraction drives are connected to a dc distribution system 50 of the battery charging station. The number of batteries that can be charged simultaneously depends on the electrical condition of the overall system and on the requirements with respect to charging time.

Eight fuel cell units 62 to 69 are connected to the dc distribution system 50 by means of bus bars 60 and 61. These fuel cell units are combined into two groups mutually connected in parallel comprising the units 62 to 65 and 66 to 69, respectively. Within the two groups, the fuel cell units are connected in series electrically. The number of parallel connected groups may be expanded arbitrarily, as indicated in FIG. 2. The same also applies to the fuel cell units connected in series within one group.

The outputs 70 to 77 with the same polarity of the series connected fuel cell units are connected to the bus bar 60 of the same polarity by means of electric connecting lines 78 to 81. An electric valve is disposed in each connecting line. Diodes 82–85 are used as electric valves in FIG. 2. On the gas side, the fuel cell units 62 to 69 are connected to the main lines 86 and 87 for hydrogen and oxygen, respectively, controlled valves 88 to 103 being disposed in the gas supply lines to the individual fuel cell units.

The fuel cell units 62 to 69 are cut in or out during the charging process by opening or closing the controlled valves in the gas supply lines associated with the respective units, and, specifically, in accordance with the electrical conditions of the charging characteristics of the respective batteries. The control commands for the valves in the gas supply lines stem, for example, from an automatic charging system. The charging voltage range is set by selecting an appropriate number of series connected fuel cell units. The charging currents are varied primarily by the number of units connected in parallel. Approximately constant charging currents can be obtained by adding series connected units in the course of the charging process.

For example, the fuel cell units 62, 63, 66 and 67 are cut-in for the charging operation via the associated controlled valves 88 to 91 and 96 to 99. The circuit is then closed via the following path: from the fuel cell units 62 and 63, including the parallel connected units 66 and 67, through the electric connecting line 79, the diode 83 and the bus bar 60 to the distribution system 50; from the distribution system 50 through the parallel connected charging cables 52, 54 and 56 to the batteries 57 to 59 and thence through the charging cables 51, 53 and 55 back to the distribution system 50; from the distribution system 50 via the bus bar 61 to the fuel cell units 62, 63, 66 and 67, the circuit then being closed. It should be noted that the charging current will always flow through at the respective electric valve 82 to 85 which carries the highest voltage in the forward direction.

What is claimed is:

1. In an electric dc source made up of fuel cells or fuel batteries, each having terminals of one and the other polarity, which are fed by gas supplies and are connected in series or in series and parallel, one end of the series connection being of the one polarity and having a terminal coupled to a bus bar of that same polarity, the improvement comprising:
    (a) a separate gas supply line and a controlled valve disposed in each gas supply line for each fuel cell or fuel battery; and
    (b) electric valves coupling the respective terminals of each of the series connected fuel cells or fuel batteries having the other polarity to a bus bar of said other polarity, whereby said fuel cells or fuel batteries can be controlled by controlling the supply of gas thereto thus controlling the overall voltage supplied by said dc source with isolation achieved by means of said electric valves.
2. The improvement according to claim 1, wherein said electric valves are diodes.
3. The improvement according to claim 1, wherein said electric valves are controlled valves.

* * * * *